No. 628,688. Patented July 11, 1899.
E. J. BRANDT.
COIN DELIVERY AND CASH REGISTER MACHINE.
(Application filed Jan. 27, 1898.)
(No Model.) 9 Sheets—Sheet 1.

Witnesses
Wm. M. Rheem
Wm. F. Henning

Inventor
Edward J. Brandt
By H. G. Underwood
Atty.

No. 628,688. Patented July 11, 1899.
E. J. BRANDT.
COIN DELIVERY AND CASH REGISTER MACHINE.
(Application filed Jan. 27, 1898.)
(No Model.) 9 Sheets—Sheet 5.

Witnesses
Inventor
Edward J. Brandt
by H. G. Underwood
Atty.

No. 628,688. Patented July 11, 1899.
E. J. BRANDT.
COIN DELIVERY AND CASH REGISTER MACHINE
(Application filed Jan. 27, 1898.)
(No Model.) 9 Sheets—Sheet 6.

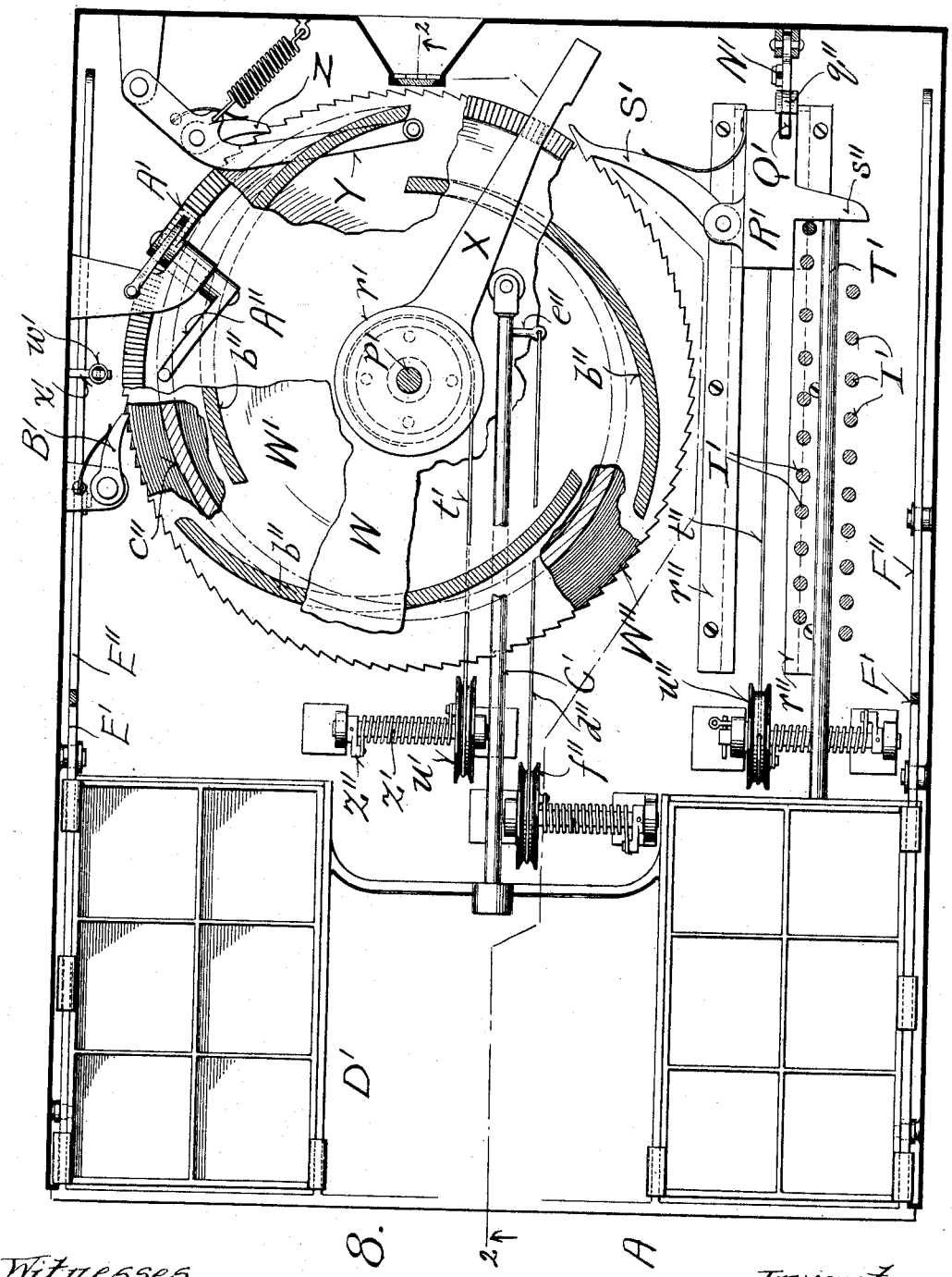

No. 628,688.  
E. J. BRANDT.  
COIN DELIVERY AND CASH REGISTER MACHINE.  
(Application filed Jan. 27, 1898.)
Patented July 11, 1899.
(No Model.)
9 Sheets—Sheet 9.
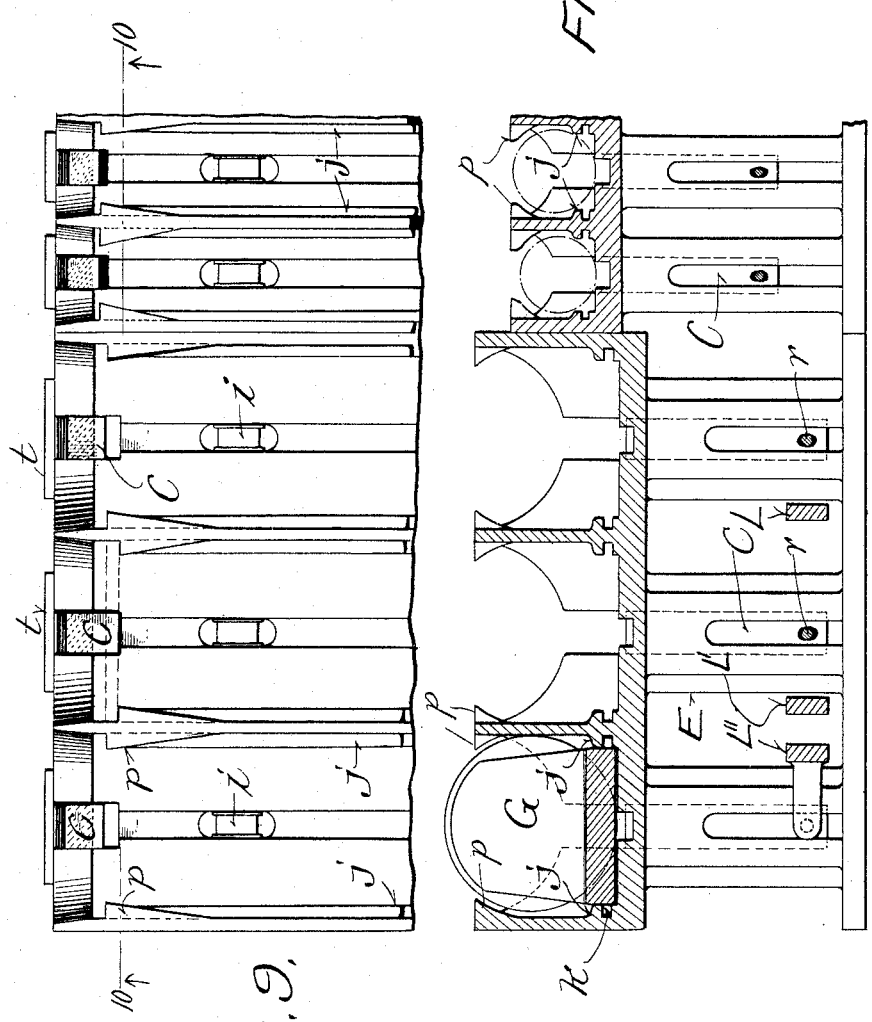

UNITED STATES PATENT OFFICE.

EDWARD J. BRANDT, OF WATERTOWN, WISCONSIN.

COIN-DELIVERY AND CASH-REGISTER MACHINE.

SPECIFICATION forming part of Letters Patent No. 628,688, dated July 11, 1899.

Application filed January 27, 1898. Serial No. 668,240. (No model.)

*To all whom it may concern:*

Be it known that I, EDWARD J. BRANDT, a citizen of the United States, and a resident of Watertown, in the county of Jefferson and State of Wisconsin, have invented certain new and useful Improvements in Coin-Delivery and Cash-Register Machines; and I do hereby declare that the following is a full, clear, and exact description thereof.

My invention has for its object to provide a machine comprising a coin-delivery apparatus and a cash-register mechanism, the former being of that class employed in banks, stores, and other places of business to facilitate making change and paying out money, said invention consisting in certain peculiarities of construction and combination of parts hereinafter specified with reference to the accompanying drawings and subsequently claimed, the preferred coin-delivery apparatus being similar to what has been heretofore set forth in my Patent No. 604,600, issued May 24, 1898.

Figure 1:
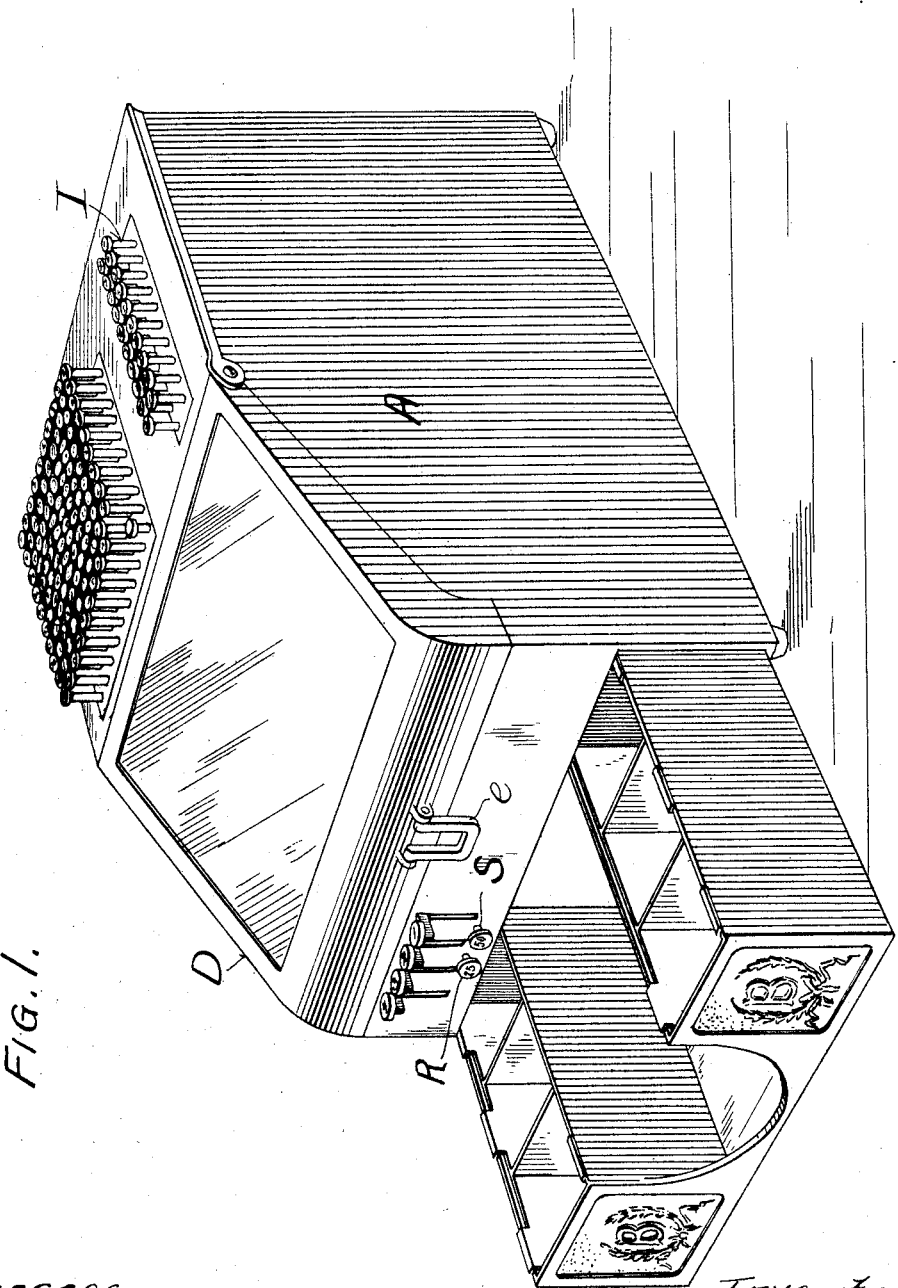
Figure 2:
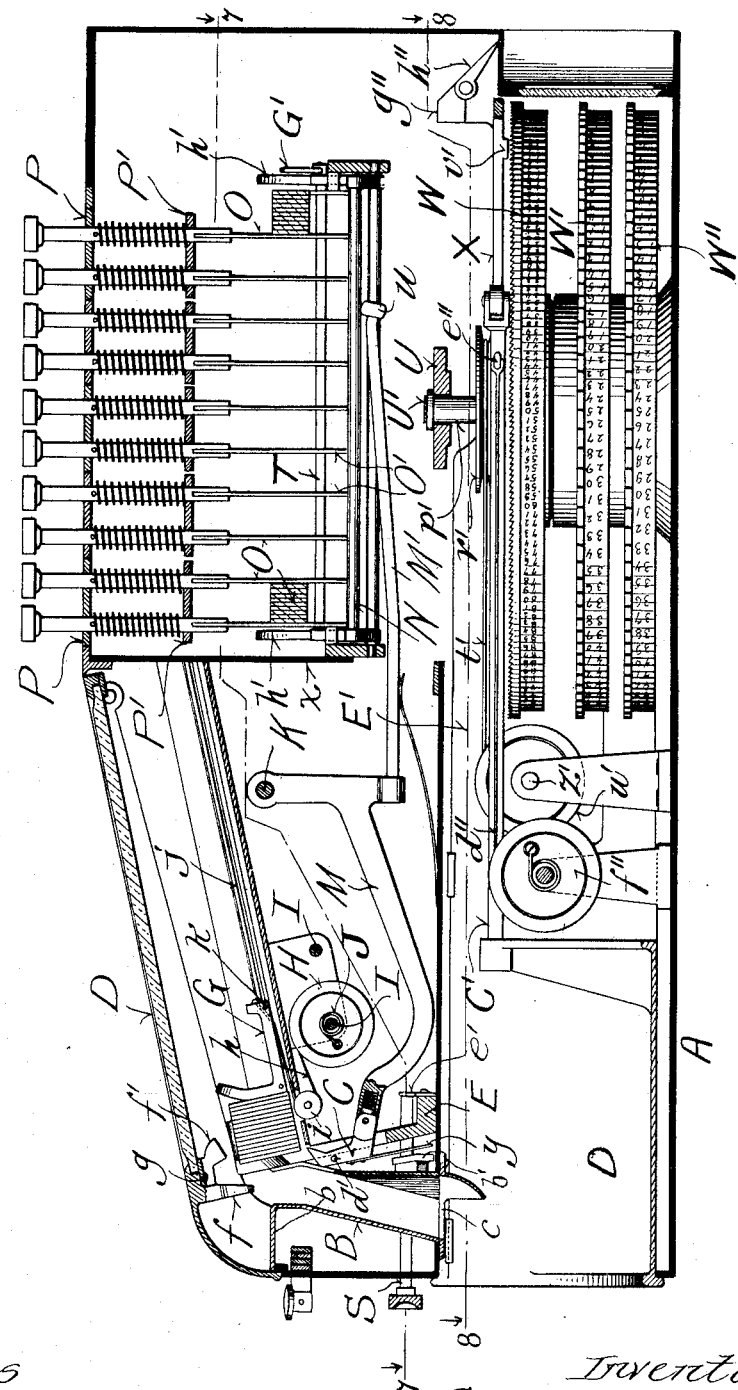
Figure 7:
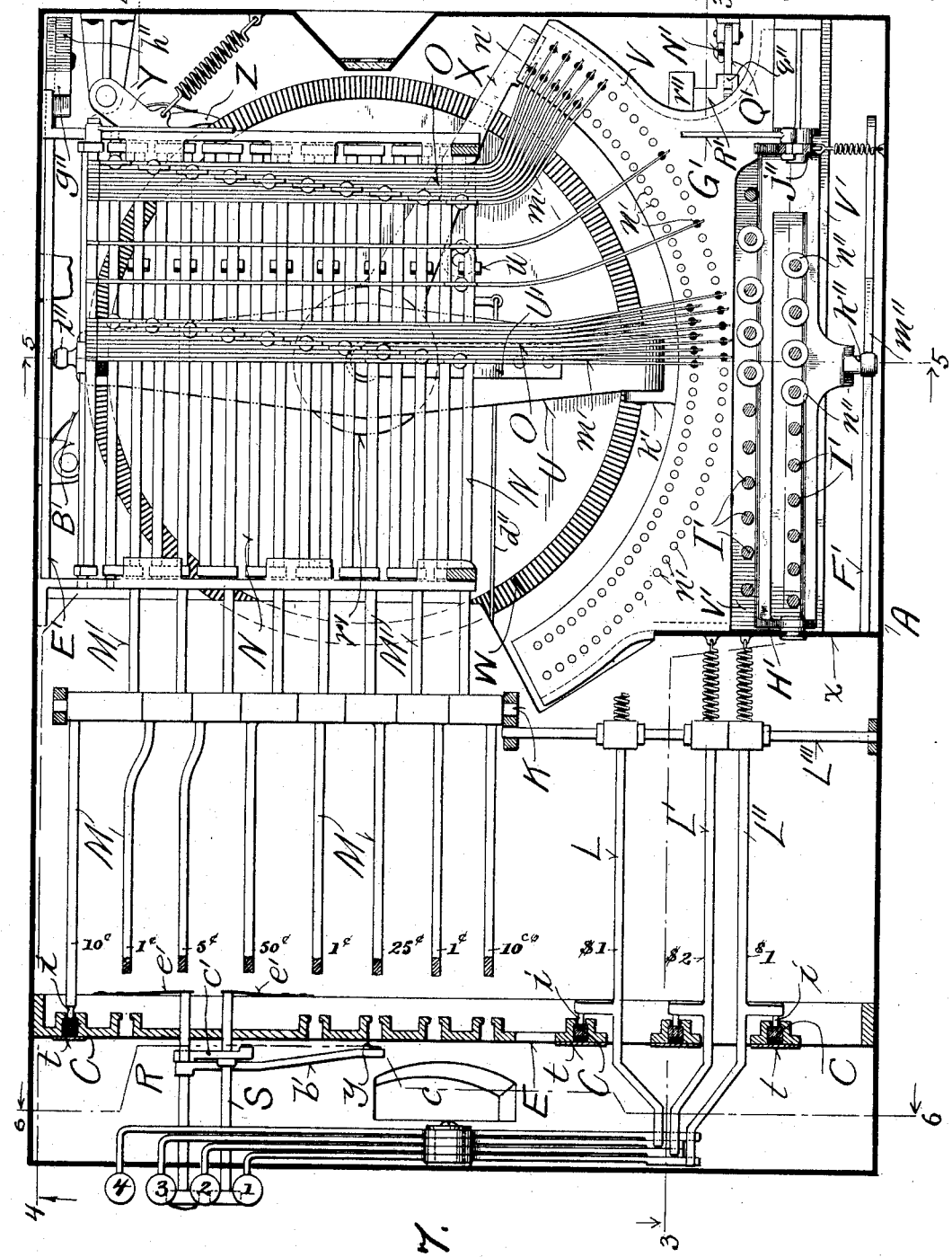

Figure 1 of the drawings represents a perspective view of the casing, exposed levers, push-pins, push-stems, and open cash-drawer of a machine constructed according to my invention; Fig. 2, a vertical longitudinal sectional view indicated by line 2 2, Fig. 8; Figs. 3, 4, 5, and 6, similar views, respectively indicated by lines 3 3, 4 4, 5 5, and 6 6 in Fig. 7; Figs. 7 and 8, plan views, partly in horizontal section, respectively indicated by lines 7 7 and 8 8 in Fig. 2 and illustrating general constructions and arrangements of parts within the casing at different elevations; Fig. 9, a detail plan view that for the most part illustrates the discharge ends of a series of coin-chutes embodied in the machine, and Fig. 10 a detail transverse section indicated by line 10 10 in the preceding figure.

Referring by letter and numeral to the drawings, A represents a rectangular casing of suitable material, preferably cast-metal sections held together in proper assemblage by such means as may be found most convenient or desirable, and it is shown that the casing may be provided with corner-feet, so as to stand at a predetermined elevation above a counter or other suitable support. Contained within the casing and provided with a horizontal upper flange $b$, joined to the front wall of the same, is a chute B, that in practice is made to extend the full width of said casing and have inclination from the sides thereof toward a central bottom outlet $c$, the back of said chute being inclined toward the rear and having its upper edge vertically notched at intervals to give clearance for a series of vertically-reciprocative coin-pushers hereinafter more particularly set forth.

It has not been deemed necessary in the present showing to illustrate chute B extending the full width of casing A, owing to the fact that this structural feature has heretofore been clearly shown in the patent aforesaid.

On a single fulcrum extending in from the front wall of the casing below chute-flange $b$ are a series of spring-controlled levers 1 2 3 4; but these levers have no connection with said flange. It is preferable to employ bow-springs connected to the levers 1 2 3 4 and have the free ends of these springs rest upon the bottom of the casing, one of the springs $d$ being clearly illustrated in Fig. 6. Knob ends of the levers extend through vertically-disposed slots in the front of the casing, and said levers operate in conjunction with coin-lifting mechanism hereinafter particularly specified.

As herein shown, the casing may be provided with a partly-glazed hinged top section D, having a handle $e$, and in practice provision may be had for locking this hinged top section in its normal position.

The notched upper edge of the rear wall of chute B rests against a transverse plate E, and this plate is provided with a series of vertical guide-slots engaged by the coin-pushers C, these slots intersecting a corresponding series of concave notches in the upper edge of said plate, as best shown in Fig. 10. The plate-notches are of variable width in proportion to arbitrarily-selected coin of any currency, and the face of each notch is preferably beveled to present a thin rear edge.

The frame of the hinged top section of the casing is provided at intervals with a series of depending fingers $f$, and a plate $g$, secured to said frame, is also provided at like intervals with similar fingers $f'$ in rear of the ones aforesaid, each pair of fingers $f f'$ being central of a concave notch in plate E above the latter, (an illustration of this feature being had in Fig. 2,) said fingers serving to deflect coin into the aforesaid chute.

Supported in the casing to extend rearward from plate E are a series of inclined coin-chutes, each of which registers with a concave notch in said plate, the bottom of each latter chute at its lower end being a suitable predetermined distance below the plate-notch with which it registers in order that the aforesaid plate may constitute a temporary stop for coins placed in said chute. Each coin-chute is herein shown as having its bottom provided with a central longitudinal groove for the engagement of a flexible strap $h$, connected at one end with a coin-follower G, this strap being extended from a spring-controlled drum H and run over a suitably-mounted pulley $i$ through an aperture intersecting the longitudinal bottom groove of said chute. Longitudinal grooves in side ribs $j$ at the bottom of each chute constitute guides for lateral lugs $k$ on the coin-follower having play in said chute, each coin-follower being a metal block of suitable design.

For handling United States coin in sums from one cent to five dollars, inclusive, the delivery apparatus may be provided with three one-dollar-coin chutes, (shown in Figs. 9 and 10,) the other coin-chutes being for cent, five-cent, dime, quarter-dollar, and half-dollar pieces. The length of all the coin-chutes is such as may be most convenient with respect to other portions of the machine, and it will be found preferable to have three chutes for cents, two for dimes, one for five-cent pieces, one for quarter-dollar coin, and one for half-dollar coin.

Columns of coin are set in the chutes provided for the same and lie intermediate of the plate E and followers G, said plate constituting a temporary stop for said coin. The coin is dislodged singly or in combinations by means of the pushers C, actuated by depression of the exposed knob ends of levers 1 2 3 4 and a series of push-pins, the latter being provided at their upper ends with buttons, on which various fractional parts of one dollar may be indexed. In practice it will be found convenient to utilize one hundred of said push-pins and have the apparatus so organized that depression of any one of ninety-nine of the same will result in the dislodgment from the machine of one or more coins equal in value to the difference between the amount that may be indexed on the pin-button and one dollar, depression of the "100" push-pin operating to dislodge sufficient coin of different denominations to make full change for one dollar. As hereinafter set forth, provision is had for preventing discharge of quarter and half dollar coin in various combinations when change out of twenty-five, fifty, or seventy-five cents is wanted from the apparatus.

Figure 3:
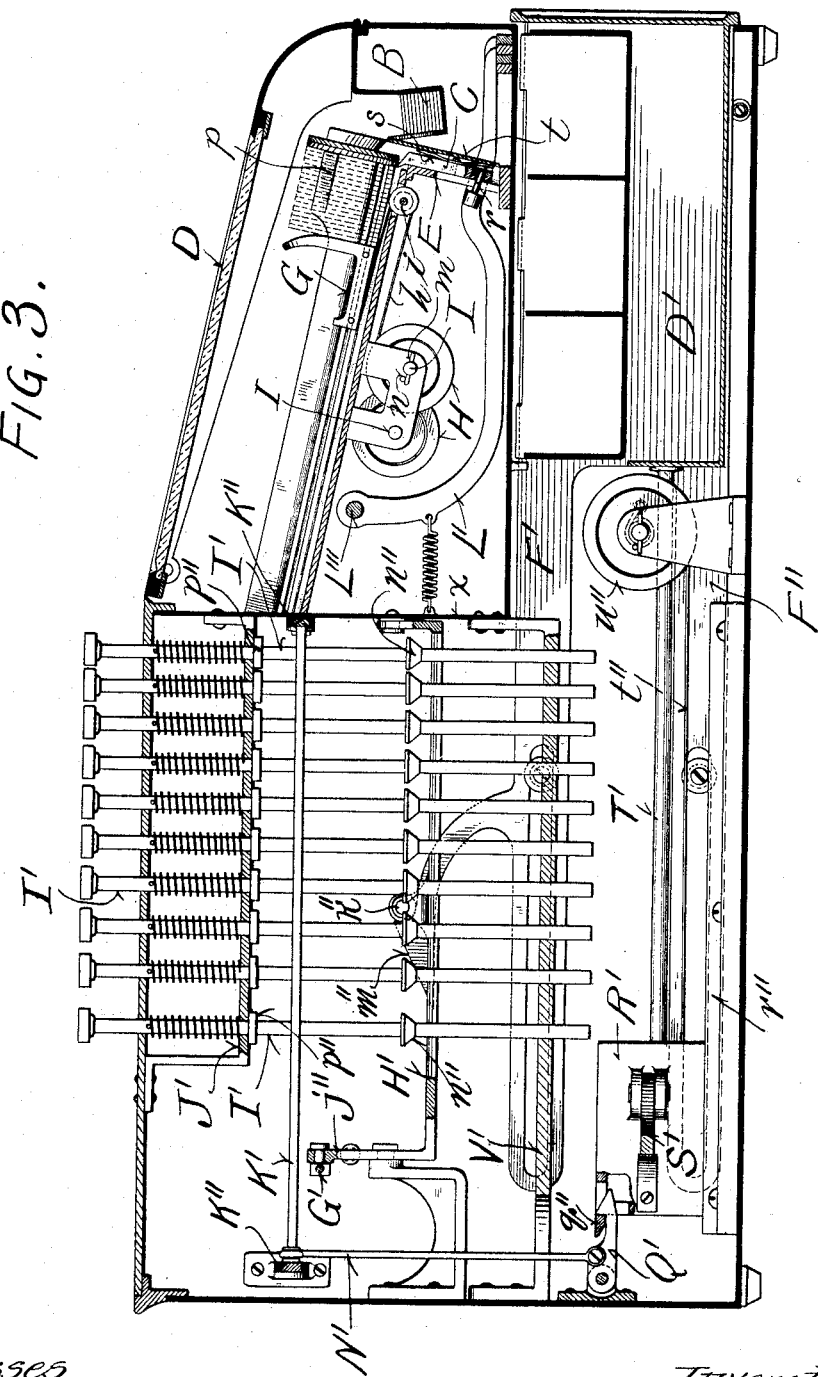

The drums H in flexible strap connection with the coin-followers G are loose on spindles I, having stationary bearings depending from the under side of the coin-chutes, and a spiral spring J, (shown in Fig. 2,) surrounding each spindle, is connected to the latter and a corresponding drum. Tension of the springs J may be finely adjusted by rotation of the spindles I, the latter being held against reverse movement after the tension adjustment is effected. For instance, as shown in Fig. 3, each spindle may be provided with a transverse turning pin $m$, opposed in its reverse path by a stop-pin $n$, having detachable engagement with a suitable aperture in an adjacent bearing for said spindle. However, the means for adjusting and maintaining the spring tension may be indefinitely varied as convenience and expediency may require.

When a follower is pushed back by the insertion of a column of coin in an inclined chute, the unwinding of the attaching-strap from a corresponding drum will proportionately increase the tension of the controlling-spring, and the latter by expansion keeps said follower in forcible contact with the coin. It will be understood that pressure of a follower diminishes in proportion to the expulsion of coin from a chute in which it has travel, this being a desirable feature, inasmuch as it results in an even smooth tension the full length of said chute. All the coin being exhausted from a chute, the follower therein will come in the path of the corresponding coin-pusher C to prevent lift of the same. Consequently the lever mechanism involved with the coin-pusher cannot be operated until said chute is replenished. The failure of the lever mechanism to respond to the operator signals an exhaust of coin from one or more chutes, this being an important feature for the reason that there cannot be a delivery of less than a predetermined value in coin incidental to operation of either lever 1, 2, 3, or 4 or any one of the aforesaid push-pins.

Upwardly-projecting wall extensions of the coin-chutes are provided at their lower ends with inwardly-extended under-curved ears $p$, (clearly illustrated in Figs. 9 and 10,) each ear of a pair being herein shown tapered toward the rear and set back far enough to permit a predetermined number of coins in a corresponding chute to pass into the path of a pusher. Each pair of chute-ears $p$ extends back far enough to prevent lift of a series of coin next in rear of the predetermined number to be dislodged by a pusher; but they offer no obstruction to the placing or removal of a column of coin grasped between a thumb and finger of a person filling or emptying the chutes.

Incidental to the action of a pusher C the opposing coin in a corresponding chute will be discharged into delivery-chute B, and means may be provided to prevent said coin from tipping forward or standing at a slant on said pusher should the latter be slowly lifted or retarded in its return to normal position, it being always desirable that said coin shall dislodge edgewise into said delivery-chute as soon as it clears a corresponding notch or notches in plate E, the deflector-fingers $ff'$ above specified aiding in the accomplishment of the above result, although it is not absolutely necessary to employ a hinged top section of the casing provided with the deflector-fingers.

Each coin-pusher is a bevel-top finger, and in practice it has spring-controlled yielding connection with a lever. In Figs. 3 and 10 it is shown that some, if not all, of the coin-pushers may have lower-end apertures in knife-edge bearing with a pin $r$ at the end of a lifting lever. With such a coin-pusher a leaf-spring $s$ is made fast midway of its length, and the ends of this spring bear against a plate $t$, rigid with the notched plate E over a vertical slot therein.

Figure 5:
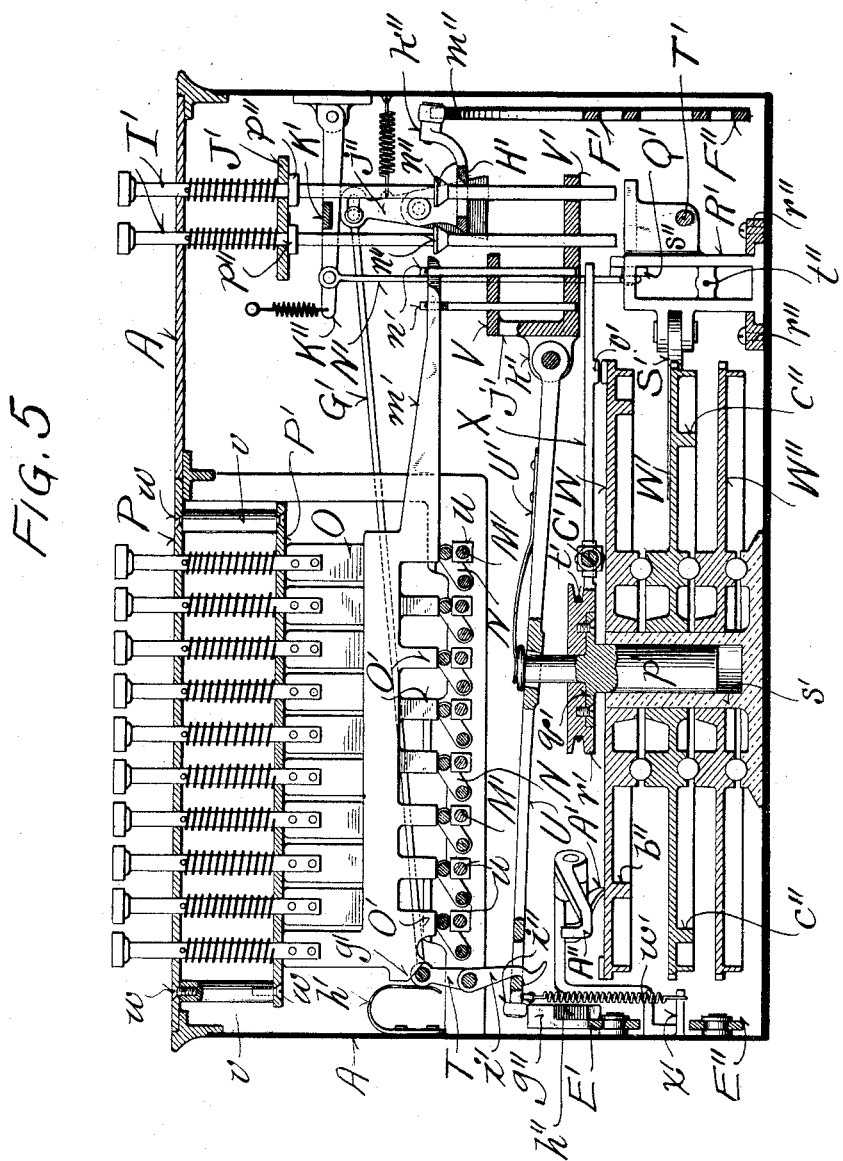
Figure 6:
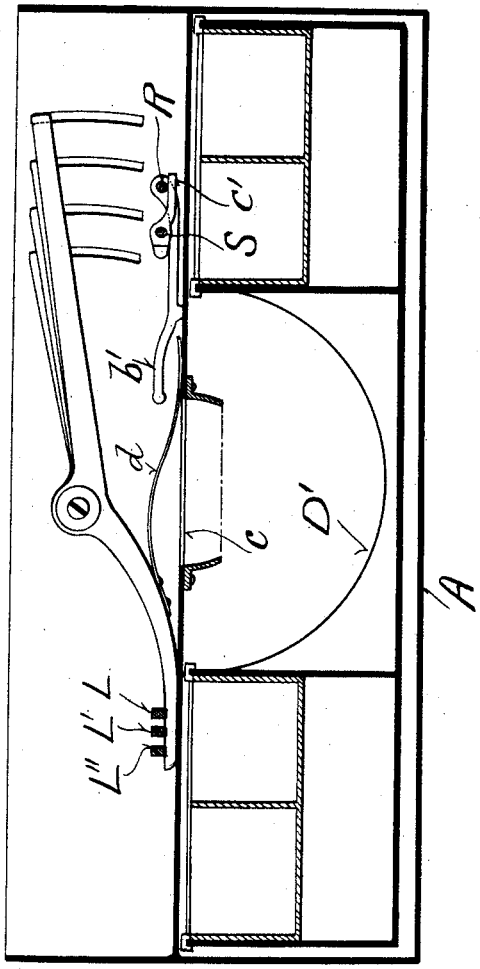

All the dollar-coin-pusher levers L L' L'' are preferably hung on a transverse rod L''', supported in the casing, and the levers M for pushers operative on fractional coins of one dollar are fulcrumed on a rod K, also supported in the said casing and provided with spring-supported crank-rod extensions M', having rear heads $u$ in opposition to rockers N, herein shown as individually comprising a pair of parallel rods in rigid link connection, one rod in each pair being mounted in suitable bearings within said casing, and in Fig. 7 all of the coin-pusher levers are indexed to correspond with coin values. The rockers N are actuated by feet O' of a series of plates O, set edgewise in the casing and connected to the push-pins, being spring-controlled and vertically reciprocative, as best shown in Figs. 2 and 5. The push-pins are guided by a pair of parallel horizontal plates P P', spaced apart by vertical stems $v$, held in place by screws $w$, as shown in Fig. 5, the upper plate in each pair constituting a rear top section of the casing, this construction and arrangement of parts facilitating the assemblage of the machine and affording ready provision for change of combinations in the coin-delivery system. Depression of any push-pin causes the foot or feet O' of a corresponding plate O to operate an equivalent number of the rockers N, thus tilting a like number of levers M having coin-pushers in connection therewith.

The dollar-coin-pusher levers L L' L'' are shown in spiral-spring connection with a transverse partition $x$ in the casing. Lever 1 actuates lever L'' to dislodge one dollar from a coin-chute. Lever 2 actuates lever L', and the coin-pusher in connection with the latter lever is designed to operate against two of the one-dollar coins in another chute at each lift, this being the coin-pusher illustrated in Fig. 3 and the second one from the left in Fig. 9, two coins in opposition to said pusher being indicated by dotted lines in the latter figure. Lever 3 actuates levers L L' to dislodge one and two dollars from separate coin-chutes at the same time, and lever 4 actuates the levers L L' L'' to dislodge four dollars from three separate chutes. However, this multiple-lever mechanism and the number of dollar-coin chutes may be varied from what is herein shown and described without change of result.

The detail respecting the coin-pusher shown in Fig. 2 is similar to what has been heretofore set forth in Patent No. 604,600 in connection with the twenty-five-cent lever of series M, the depending plate $y'$ of said pusher being in opposition to a parallel upwardly-extending end of a lateral arm $b'$, pertaining to a horizontal push-pin R, that is well shown in Fig. 7, but hid in said Fig. 2 by a parallel push-pin S, both of these pins being loose in guide-apertures with which the front of the casing and plate E are provided. Push-pin S is also provided with a lateral arm, and like in the above-named patent this arm $c'$ is intended for operation against a depending plate of another coin-pusher in spring-controlled pivotal connection with the fifty-cent lever of series M, this latter arm being in the path of arm $b'$, that extends from push-pin R above specified, as shown in Fig. 7. Inward movement of horizontal pin S operates to trip the corresponding pusher out of working position with respect to half-dollar coin, and like movement of the other horizontal pin R operates to bring the quarter and half-dollar coin pushers simultaneously out of working position. By means of said push-pins coins to the value of fifty or seventy-five cents may be retained in the machine as parts of one dollar when change is wanted for the difference between the amount of a sale more than ten cents and less than one dollar. In other words, if there be a sale amounting to thirteen cents and a quarter-dollar be given in payment operation of push-pin R will cause retention of seventy-five cents in the machine when push-pin 13 is depressed. Therefore the change obtained from said machine will be the difference between the amount of sale and remaining quarter-dollar. If there be a sale of thirty-seven cents and a half-dollar be given in payment, operation of push-pins S and 37 will result in delivery of correct change from the machine. Should a sale amount to sixty-one cents and a half and quarter dollar be given by the buyer, operation of push-pins R and 61 will result in delivery of correct change. In view of the foregoing it is obvious that the coin-delivery apparatus schemed on a unit of any currency may have provision for the operator to facilitate computation of change out of various payments constituting fractions of said unit, it being possible to indefinitely amplify the system of push-pins R S and mechanism in connection therewith for throwing coin-pushers out of working position. It is also to be understood that by like means provision may be had for throwing all of the fractional-coin pushers out of working position at times when the coin-delivery apparatus is organized to coöperate with a cash-register mechanism. The buttons shown on the outer end of push-pins R S are preferably of contrasting face, and, as herein shown, one may be convex and the other concave, whereby either may be readily distinguished. According to the scheme herein particularly set forth if one dime be given in payment for a sale less than ten cents the push-pin corresponding to the difference between this sale and one dollar will be operated to obtain the correct change, and as a matter of convenience the push-pins 91 to 99, inclusive, may be reversely indexed "1" to "9," inclusive, to facilitate making change between one dime and a less number of cents.

The general assemblage and operation of parts thus far described are practically the same as have been set forth in my patent aforesaid, and the major portion of the mechanism hereinafter specified is especially organized with reference to registration of cash receipts, although it coöperates with the coin-delivery apparatus, and, as above inferred, provision may be had, when desirable, for throwing all the pushers C for fractional coin of one dollar out of working position for a time in order that there may be registration of cash without simultaneous delivery of money.

Inasmuch as one push-pin and arm operative to throw one coin-pusher out of working position have been shown, it has not been deemed necessary to show a similar pin and arm or other mechanism operative on all the pushers for the fractional coin, as such showing would be a mere duplication of parts not necessary to the full understanding of my invention.

Figure 4:
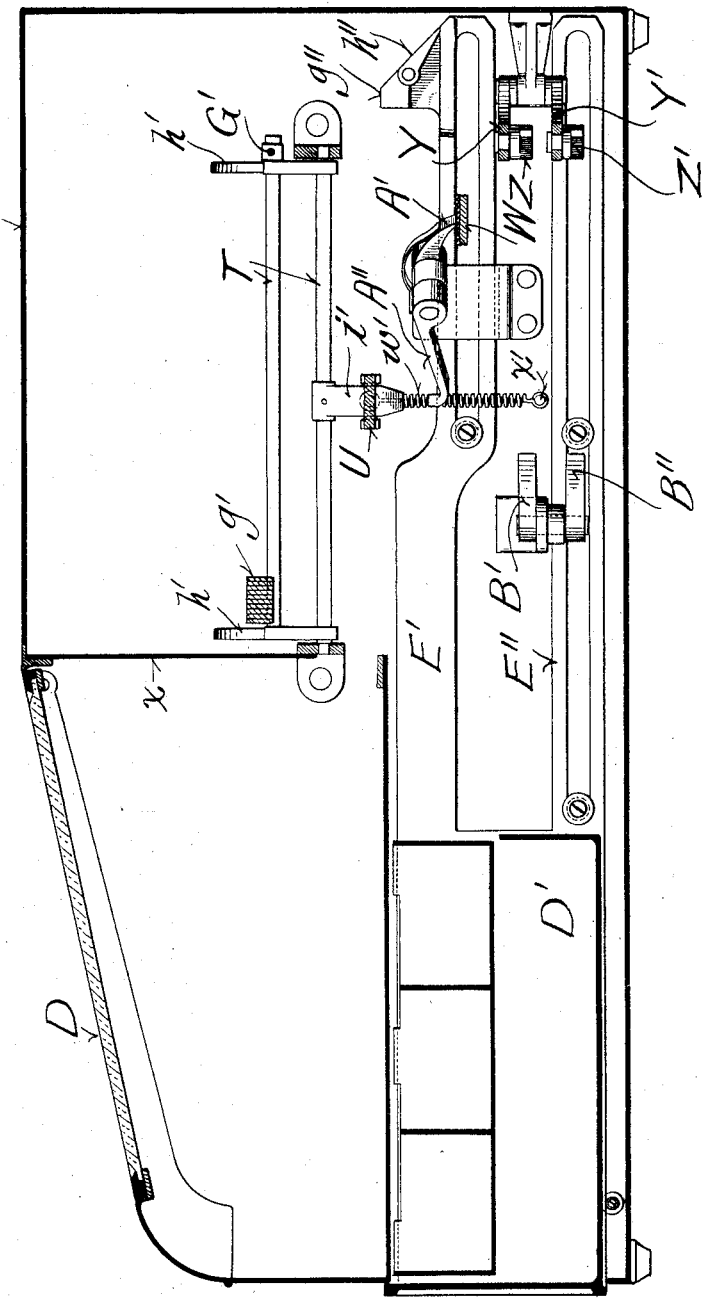

In the present machine each of the plates O has a shouldered cam end $g'$ opposed to a rocker T similar to the ones N, the single rocker common to all of said plates being clearly illustrated in Figs. 4 and 5. Bowsprings $h'$, attached to a side wall of the casing, oppose movement of rocker T in one direction and keep the same always in contact with the shouldered cam ends of all the plates O, a cam-latch $i'$, depending from said rocker midway of its ends, being operative in conjunction with one end of a lever U, the other end of this lever being in pivotal connection with a stationary bracket, herein shown as comprising two plates V V', spaced apart by a vertical web $j'$, having lateral ears $k'$ engaged by the fulcrum-pin or trunnions of said lever. Each of the plates O has a prolongation $m'$, from which depends a plunger $n'$, that is guided in vertical apertures of plates V V', and as a matter of detail the upper end of each plunger may be kerfed to receive the plate prolongation $m'$, the latter being held in engagement with the kerf by a stay-pin arranged in said plunger, transversely of the same.

The guide-apertures for the plunger $n'$ are on segments of concentric circles, and the majority of the plate prolongations $m'$ are necessarily offset, as shown in Fig. 7, inasmuch as all of said apertures are radial from the same center and at equal distances apart on the same arc in conformity to a circle of teeth on a register-disk W in a series hereinafter particularly set forth; but all said plate prolongations are practically radial from the aforesaid center.

The lever U has an aperture intermediate of its ends loosely engaged by a headed stem $p'$ in opposition to a flat spring U', fast at one end to said lever. Made fast to a horizontal annular flange $q'$ of the stem $p'$ by suitable means, such as screws, (shown in Fig. 5,) is a sheave $r'$, constituting the inner end of a pawl-arm X, operative in conjunction with teeth of disk W, the latter and other toothed disks W' W'' having their hubs in loose engagement with a hollow boss $s'$, extending up from the bottom of the casing, the boss constituting a sleeve in which the lower portion of stem $p'$ has vertical play. The lower disk of the series is shown in ball-bearing with a flange of the boss $s'$ at the lower end of the same, and each other disk in the series is in like bearing with the one next below.

The sheave end of pawl-arm X has flexible strap connection $t'$ with a spring-controlled winding-drum $u'$ under tension, as clearly shown in Fig. 8, and the pawl $v'$ of said arm is normally out of engagement with the adjacent disk, owing to an upward lift of lever U and its suspension by cam-latch $i'$, said lever being lifted against resistance of a spiral spring $w'$, that connects it with a lug $x'$, projecting laterally from a side wall of the casing. As a matter of detail, the winding-drum $u'$ is provided with a lateral lug connected to a spiral spring surrounding a spindle $z'$, with which said drum is loosely engaged, and a crank $z''$ of the spindle is fast to the other end of the spring, said spindle being journaled in suitable stationary bearings. Provision may be had for adjusting the spring tension, and all of the spring-controlled winding-drum mechanisms hereinafter set forth are practically the same as the one just specified.

In the present organization of the machine the disk W has three hundred teeth and each of the other disks W' W'' in the series has one hundred teeth. The teeth are consecutively numbered on peripheral flanges of the disks, and these flanges may be observed through a glazed aperture in a side wall of the casing, this aperture being shown in Figs. 2 and 8. The primary or three-hundred-toothed disk has its under side provided with eccentric flanges $b''$, each equal in length to one-third the circumference of said disk, and these flanges operate successively upon a spring-controlled pivotal arm Y, that carries a spring-controlled pivotal pawl Z, operative, in conjunction with teeth of disk W', to move the latter one-hundredth of one revolution to one-third of one revolution made by the preceding primary disk.

A spring-controlled pivotal detent A' operates, in conjunction with the teeth of disk W, and similar detents B' B" operate, in conjunction with teeth of disks W' W", to hold the same in automatically-adjusted position, the disk W" being given one-hundredth of one revolution at the completion of a full revolution of disk W' incidental to a spiral flange $c''$ on the latter disk operating, in conjunction with a spring-controlled pivotal arm Y', carrying a spring-controlled pawl Z', cooperative with the teeth of disk W", the latter pawl-arm being on the same pivot as the one, Y, aforesaid, as shown in Fig. 4, and each of these pawl-arms is preferably provided with an antifriction flange-opposing roller.

The pawl-arm X is opposed by an antifriction-roller carried by a push-rod C', made fast to the rear of a cash-drawer D', guided in the forward portion of the casing, and a flexible strap $d''$ connects a lateral branch $e''$ of the push-rod with a spring-controlled winding-drum $f''$ under tension, as clearly illustrated in Fig. 8. The cash-drawer is shown as comprising two side boxes containing upper side trays divided into compartments for coin, the space under the trays being for bills, checks, &c., while the space intermediate of said boxes is sufficient to permit of the machine operator putting one hand into position under the opening $c$ in the chute B to receive coin released by the means above specified.

Extending rearward from the drawer are longitudinally-slotted bars E' E" F' F", engaging antifriction-rollers having their bearings upon sides of the casing. The slotted portion of bar E' is lower than the remainder thereof and provided with an offset upwardly-projecting lug $g''$ at the rear, this lug presenting an inclined rear edge flush with a correspondingly-inclined dog $h''$ in pivotal connection therewith, this construction being best illustrated in Fig. 4. An antifriction-roller $i''$ on the free end of lever U is lifted by the dog and lug to cause said lever to operate the cam-latch $i'$ and engage the same, as shown in Fig. 5; but upon release of said latch contraction of spring $w'$ operates to draw down said lever and bring its antifriction-roller in the outward path of said dog. Descent of lever U operates to effect an engagement of pawl $v'$ of arm X with the toothed disk W, and subsequent to this operation said lever by further descent will operate upon a crank $A''$ of the detent A' to bring the latter out of engagement with said disk, the spring U' on the aforesaid lever yielding to the resistance of stem $p'$, then at its greatest depth, in the hollow boss $s'$, with which it is engaged. The downward movement of a plate O, necessary to latch-releasing tilt of rocker T, also causes pull upon a link-rod G', connecting said rocker with the transversely-slotted upper end of a crank $j''$, rising from the rear extremity of a pivotal horizontal plate H', the latter having a longitudinal slot therein and provided with a latch-prong $k''$ for automatic engagement of a bevel-end catch-hook $m''$, rising from bar F', extending rearward from the cash-drawer, this hook being best shown in Fig. 3. Pull on the link-rod causes the latch-prong to automatically disengage from the catch-hook, thus permitting outward play of the cash-drawer and its attachments, owing to the draw of the spring-controlled drum $f''$ on the flexible strap $d''$, connected to push-rod C', in union with said drawer. In the meantime the rocker T has been automatically engaged by the adjacent shoulder of the depressed plate O, incidental to expansion of bow-springs $h'$, and the plunger suspended by said plate has been brought in the path of pawl-arm X, the latter being operated by wind of spring-controlled drum $u'$ to operate the disk W, with which engagement has been previously effected, whereby registration is had of the receipt of the fractional part of one dollar corresponding to the depressed plate.

In the present organization of the machine the rearmost plate of series O is the one arbitrarily selected for dislodgment of full change for one dollar, and, as shown in Fig. 7, disposition of the plunger in connection therewith is such that the pawl-arm X is held against rotary movement when said plate is depressed. Consequently no registration is effected. All the plate-actuated plungers $n'$ are so arranged that the pawl-arm X will move the disk W the distance of as many teeth on the latter as there may be cents in a cash receipt less than one dollar.

It is obvious that upon manual return of the cash-drawer to normal position the lever U will be lifted by dog $h''$ in pivotal connection with the bar E', extending rearward from said drawer to thereby permit the detent A' to engage disk W before pawl-arm X is disengaged therefrom, said lever being caught by cam-latch $i'$ after it has operated same to tilt rocker T out of engagement with the adjacent shoulder of the depressed plate, the latter automatically returning to normal position incidental to expansion of the previously-compressed spring controlling its push-pin. The pawl-arm having been disengaged from the disk W, it will be returned to normal position by action of push-rod C', and the hook $m''$ of bar F' will engage latch-prong $k''$ of the pivotal and cranked plate H' to hold the cash-drawer in closed position.

The inner longitudinal edge of plate H' and the outer parallel edge of its slot are beveled to match the bevel of collars $n''$ on a series of vertically-reciprocative push-stems I', each of the latter being provided with another but non-beveled collar $p''$, arranged intermediate of a stationary guide-plate J' and a bar K', this bar being joined at its ends to spring-controlled arms K" in pivotal connection with a side wall of the casing and constituting therewith a tilt-frame operative incidental to depression of any of said push-stems. The push-stems extend upward through corresponding apertures in the top of the casing and are provided at their upper ends with buttons that may be indexed to indicate amounts in dollars or unit of currency upon which the machine is schemed. Depending from one of the spring-controlled arms K" of the tilt-frame is a link N', connected to a pivotal spring-controlled latch Q', engageable with a catch-lug q" on a slide R', having guides r" on the bottom of the casing longitudinally of the latter. A spring-controlled pawl S' in pivotal connection with the slide operates in conjunction with teeth of disk W', as best shown in Fig. 8, and a lug s", extending laterally from said slide, is opposed by a push-rod T', extending rearward from the cash-drawer. Depression of a push-stem I' will operate by its bevel-collar to tilt the plate II', and thus unlatch the cash-drawer, the crank j" of said plate having free slot-and-pin connection with link-rod G' to thereby prevent action of the cents-register disk. When this action takes place, the bevel-collar is caught under plate II' to hold said stem depressed. At the same time there is automatic release of latch Q' by the action of the non-beveled push-stem collar on the aforesaid tilt-frame, and a flexible strap t", connecting the slide R' with a spring-controlled winding-drum u", will be automatically wound upon the latter to draw said slide as far as the depressed push-stem in its path will allow. Incidental to this movement the disk W' is actuated by pawl S' and moved the distance of as many teeth as there may be dollars cash receipts. The cash-drawer being pushed in, the plate II' will be tilted to permit automatic return of the previously-depressed push-stem to normal position, and the slide R' will be run back to its normal position incidental to action of push-rod T' in union with said drawer.

To prevent operation of register-disk W' when full change is to be given for a bill or coin having value greater than one dollar, one of the push-stems will be arranged, as shown in Fig. 8, to come immediately opposite slide-lug s" when depressed, although the cash-drawer is released in the manner above stated.

Any reciprocative device provided with the push-rods C' T' may be utilized in place of the cash-drawer specified, and various changes of mechanical detail may be made in the machine without affecting the general scope of my invention.

When a machine such as that above described is utilized in a store, the operator obtains change in fractional coins of one dollar by manipulation of the vertical push-pins pertaining to the plates in series O and at times operates push-pins R or S for the purpose above specified. If the change involves one or more dollars, the operator of the machine manipulates levers 1, 2, 3, or 4. For instance, if a sale amounts to one dollar and thirty-seven cents and change is required from a five-dollar coin, note, or check a depression of push-pin 37 in the group pertaining to the plates in series O and actuation of lever 3 will result in dislodging three one-dollar coins and sixty-three cents in fractional coin from the machine. Depression of push-pin 37 in the above transaction automatically unlatches the cash-drawer or other spring-controlled reciprocative device in connection with the push-rods C' T', and hence pawl-arm X will automatically follow the first of said push-rods until checked by the plunger n' on the prolongation m' of the plate O in connection with the aforesaid push-pin. Therefore the disk W will have partial rotation the distance of thirty-seven teeth to register the cents of the sale. In the meantime the push-stem I for one dollar having been depressed to unlatch and check slide R', outward movement of the latter serving to impart rotary movement to disk W' the distance of one tooth, thereby registering the dollar value of the sale.

It has been heretofore explained how disk W multiplies onto disk W' and the latter onto disk W", although the two former disks operate at times independent of each other, and it is to be understood that pawl-arm X and slide R' are restored to normal position after each transaction in which they have been involved.

It has been heretofore fully explained how even change for one dollar may be had and also how the cash-drawer in event of no sale may be sprung open without affecting the register mechanism.

Having thus described my invention, what I claim as new, and desire to secure by Letters Patent, is—

1. A coin-delivery apparatus comprising a series of inclined coin-chutes, a temporary coin-stop at the lower ends of the chutes, a coin-follower under tension in each of said chutes, and a coin-ejector mechanism; together with an automatic cash-register embracing a plurality of rotative disks, means for transmitting motion from one disk to another at predetermined intervals, a disk-actuating mechanism, stops operative in conjunction with coin-ejector mechanism to limit play of the disk-actuating mechanism, a resetter for this disk-actuating mechanism and a latch for the resetter having release incidental to operation of coin-ejector mechanism.

2. A coin-delivery apparatus comprising a series of inclined coin-chutes, a temporary coin-stop at the lower ends of the chutes, a coin-follower under tension in each of said chutes, a coin-ejector mechanism operative to lift coin clear of the stop, and deflectors for the lifted coin; together with an automatic cash-register embracing a plurality of rotative disks, means for transmitting motion from one disk to another at predetermined intervals, a disk-actuating mechanism, stops operative in conjunction with coin-ejector mechanism to limit play of the disk-actuating mechanism, a resetter for this disk-actuating mechanism and a latch for the resetter having release incidental to operation of coin-ejector mechanism.

3. A coin-delivery apparatus comprising a series of inclined coin-chutes, a temporary coin-stop at the lower ends of the chutes, a coin-follower under tension in each of said chutes, a series of lever-controlled pushers operative to lift coin clear of the stop, a series of rockers in opposition to the pusher-levers, and a series of reciprocative edgewise plates having feet in opposition to the rockers; together with an automatic cash-register embracing a plurality of rotative disks, means for transmitting motion from one disk to another at predetermined intervals a disk-actuating mechanism, stops operative in conjunction with said plates to limit play of the disk-actuating mechanism, a resetter for this disk-actuating mechanism, and a latch for the resetter having release incidental to an operation of any one of the aforesaid plates.

4. A coin-delivery apparatus comprising a series of inclined coin-chutes, a temporary coin-stop at the lower ends of the chutes, a delivery-chute in front of this coin-stop, a coin-follower under tension in each of said coin-chutes, a series of lever-controlled pushers operative to lift coin clear of said stop, a series of rockers in opposition to the pusher-levers, and a series of reciprocative edgewise plates having feet in opposition to the rockers; together with an automatic cash-register embracing a plurality of rotative disks, means for transmitting motion from one disk to another at predetermined intervals a disk-actuating mechanism, stops operative in conjunction with said plates to limit play of the disk-actuating mechanism, a resetter for this disk-actuating mechanism, and a latch for the resetter having release incidental to an operation of any one of the aforesaid plates.

5. A coin-delivery apparatus comprising a series of inclined coin-chutes, a temporary coin-stop at the lower ends of the chutes, a coin-follower under tension in each of said chutes, a series of lever-controlled pushers operative to eject coin from certain of the chutes, a series of rockers in opposition to the pusher-levers, and a series of reciprocative edgewise plates having feet operative on the rockers, other pushers operative to eject coin from the remaining chutes, and a multiple-lever mechanism operative in conjunction with the latter pushers; together with an automatic cash-register embracing a plurality of rotative disks, means for transmitting motion from one disk to another at predetermined intervals a disk-actuating mechanism, stops operative in conjunction with said plates to limit play of the disk-actuating mechanism, a resetter for this disk-actuating mechanism, and a latch for the resetter having release incidental to an operation of any one of the aforesaid plates.

6. A coin-delivery apparatus comprising a series of inclined coin-chutes, a temporary coin-stop at the lower ends of the chutes, a coin-follower under tension in each of said chutes, a series of lever-and-spring controlled pushers operative to eject coin from the aforesaid chutes, a series of rockers in opposition to the pusher-levers and a series of reciprocative edgewise plates having feet operative on the rockers; together with an automatic cash-register embracing a plurality of rotative disks, means for transmitting motion from one disk to another at predetermined intervals a disk-actuating mechanism, stops operative in conjunction with said plates to limit play of the disk-actuating mechanism, a resetter for this disk-actuating mechanism, and a latch for the resetter having release incidental to an operation of any one of the aforesaid plates.

7. A coin-delivery apparatus comprising a series of inclined coin-chutes, a temporary coin-stop at the lower ends of the chutes, a coin-follower under tension in each of said chutes, a series of lever-controlled pushers operative to eject coin from the chutes, and suitable mechanism for operating single levers and combinations of levers; together with an automatic cash-register embracing a plurality of rotative disks, means for transmitting motion from one disk to another at predetermined intervals, a disk-actuating mechanism, stops operative with lever-actuating mechanism to limit play of the disk-actuating mechanism, a resetter for this disk-actuating mechanism and a latch for the resetter having release incidental to an operation of lever-actuating mechanism.

8. A coin-delivery apparatus comprising a series of inclined coin-chutes, a temporary coin-stop at the lower ends of the chutes, a coin-follower under tension in each of said chutes, a series of levers, coin-ejectors in yielding connection with the levers, and suitable mechanism for operating single levers and combinations of levers; together with an automatic cash-register embracing a plurality of rotative disks, means for transmitting motion from one disk to another at predetermined intervals, a disk-actuating mechanism, stops operative with lever-actuating mechanism to limit play of the disk-actuating mechanism, a resetter for this disk-actuating mechanism, and a latch for the resetter having release incidental to an operation of lever-actuating mechanism.

9. A coin-delivery apparatus comprising a series of inclined chutes, a temporary coin-stop at the lower ends of the chutes, a coin-follower under tension in each of said chutes, levers having terminal pins, coin-pushers having end apertures provided with knife-edge bearings for the terminal pins of the levers, a leaf-spring made fast to each of the aforesaid coin-pushers to have bearings at its ends against a fixed resistance, and suitable mechanism for operating single levers and combinations of levers; together with an automatic cash-register embracing a plurality of rotative disks, means for transmitting motion from one disk to another at predetermined intervals, a disk-actuating mechanism, stops operative with lever-actuating mechanism to limit play of the disk-actuating mechanism, a resetter for this disk-actuating mechanism and a latch for the resetter having release incidental to an operation of lever-actuating mechanism.

10. A coin-delivery apparatus comprising a series of inclined coin-chutes, a temporary coin-stop at the lower ends of the chutes, a coin-follower under tension in each of said chutes, a series of lever-controlled yielding pushers operative to eject coin from the chutes, suitable mechanism for operating single levers and combinations of levers, and other suitable mechanism operative to throw one or more coin-pushers out of working position; together with an automatic cash-register embracing a plurality of rotative disks, means for transmitting motion from one disk to another at predetermined intervals, a disk-actuating mechanism, stops operative with lever-actuating mechanism to limit play of the disk-actuating mechanism, a resetter for this disk-actuating mechanism, and a latch for the resetter having release incidental to an operation of lever-actuating mechanism.

11. A coin-delivery apparatus comprising a series of inclined coin-chutes, a temporary coin-stop at the lower ends of the chutes, a coin-follower under tension in each of said chutes, a series of lever-controlled yielding pushers operative to eject coin from the chutes, suitable mechanism for operating the pushers singly or in combinations to eject coin from the chutes, and spring-controlled push-pins operative in conjunction with one or more coin-pushers to throw the same out of working position; together with an automatic cash-register embracing a plurality of rotative disks, means for transmitting motion from one disk to another at predetermined intervals, a disk-actuating mechanism, stops operative in conjunction with pusher-actuating mechanism to limit play of the disk-actuating mechanism, a resetter for this disk-actuating mechanism, and a latch for the resetter having release incidental to an operation of pusher-actuating mechanism.

12. A coin-delivery apparatus comprising a series of inclined coin-chutes, a temporary coin-stop at the lower ends of the chutes, chute-engaging coin-followers, flexible straps connected to the coin-followers and trained on pulleys through apertures in chute-bottoms, spindles mounted in stationary bearings, strap-winding drums loose on the spindles, spiral springs on said spindles connecting the latter with the drums, and suitable mechanism for ejecting coin from said chutes; together with an automatic cash-register embracing a plurality of rotative disks, means for transmitting motion from one disk to another at predetermined intervals, a disk-actuating mechanism, stops operative in conjunction with coin-ejector mechanism to limit play of the disk-actuating mechanism, a resetter for this disk-actuating mechanism, and a latch for the resetter having release incidental to an operation of coin-ejector mechanism.

13. A coin-delivery apparatus comprising a series of inclined coin-chutes, a temporary coin-stop at the lower ends of the chutes, chute-engaging coin-followers, flexible straps connected to the coin-followers and trained on pulleys through apertures in chute-bottoms, spindles mounted in stationary bearings, strap-winding drums loose on the spindles, spiral springs on said spindles connecting the same with the drums, stops for retaining the spindles in rotary adjusted position to vary spring tension, and suitable mechanism for ejecting coin from said chutes; together with an automatic cash-register embracing a plurality of rotative disks, means for transmitting motion from one disk to another at predetermined intervals, a disk-actuating mechanism, stops operative in conjunction with coin-ejector mechanism to limit play of the disk-actuating mechanism, a resetter for this disk-actuating mechanism, and a latch for the resetter having release incidental to an operation of coin-ejector mechanism.

14. A coin-delivery apparatus comprising a series of inclined coin-chutes, a temporary coin-stop at the lower ends of the chutes, a coin-follower under tension in each of said chutes, a fulcrum-rod, a series of levers supported on the rod and provided with crank-rod extensions, a series of rockers operative on said lever extensions, reciprocative edgewise plates having feet operative on the rockers, and pushers in connection with the levers operative to eject coin from said chutes; together with an automatic cash-register embracing a plurality of rotative disks, means for transmitting motion from one disk to another at predetermined intervals, a disk-actuating mechanism, stops operative in conjunction with said plates to limit play of the disk-actuating mechanism, a resetter for this disk-actuating mechanism, and a latch for the resetter having release incidental to an operation of any one of the aforesaid plates.

15. A coin-delivery apparatus comprising a series of inclined coin-chutes, a temporary coin-stop at the lower ends of the chutes, a coin-follower under tension in each of said chutes, a series of levers, pushers in connection with the levers and operative to eject coin from all but three of the chutes, a series of rockers in opposition to said levers, a series of reciprocative edgewise plates having feet operative on the rockers, pushers operative to eject single coin from each of two chutes in the series of three and another pusher operative to eject two coins from the remaining chute, a lever in connection with each of the latter pushers, and tilt-levers arranged with reference to the latter pusher-levers so that one, two, or all three of the same may be operated by a single impulse; and an automatic cash-register mechanism coöperative with the reciprocative plates.

16. A coin-delivery apparatus comprising a series of three inclined coin-chutes, a temporary coin-stop at the lower ends of the chutes, a coin-follower under tension in each of said chutes, three levers each carrying a coin-pusher, two of the pushers being operative on single coin in two chutes and the other on two coins in the remaining chute, and a series of four tilt-levers operative in conjunction with the former levers to effect ejectment of one, two, three or four coins from the aforesaid chutes; together with cash-register mechanism and means for operating the same.

17. A coin-delivery apparatus comprising a suitable casing, a series of inclined chutes in the casing, a temporary coin-stop at the lower ends of the chutes, a coin-follower under tension in each of said chutes, a system of levers carrying pushers operative to eject coin from the chutes, a series of lever-actuating rockers, edgewise plates having feet operative on the rockers, spring-controlled push-pins connected to the plates, and pairs of suitably-connected and spaced-apart guide-plates for the push-pins, the upper guide-plate of each pair constituting a top section of the casing; together with an automatic cash-register embracing a plurality of rotative disks, means for transmitting motion from one disk to another at predetermined intervals, a disk-actuating mechanism, stops operative in conjunction with said plates to limit play of the disk-actuating mechanism, a resetter for this disk-actuating mechanism, and a latch for the resetter having release incidental to an operation of any one of the aforesaid plates.

18. A coin-delivery apparatus comprising a series of inclined coin-chutes, a temporary coin-stop at the lower ends of the chutes, a coin-follower under tension in each of said chutes, ejector mechanisms operative on single coin and combinations of coin, and stop-ears extending inward from walls of each chute in opposition to coin in rear of those in position to be ejected; together with an automatic cash-register embracing a plurality of rotative disks, means for transmitting motion from one disk to another at predetermined intervals, a disk-actuating mechanism, stops operative in conjunction with coin-ejector mechanism to limit play of the disk-actuating mechanism, a resetter for this disk-actuating mechanism, and a latch for the resetter having release incidental to an operation of coin-ejector mechanism.

19. A coin-delivery apparatus comprising a series of inclined coin-chutes, a temporary coin-stop at the lower ends of the chutes, a coin-follower under tension in each of said chutes, ejector mechanisms operative on single coin and combinations of coin, and under curved rearwardly-tapered stop-ears extending inward from chute-walls in opposition to coin in rear of those in position to be ejected; together with an automatic cash-register embracing a plurality of rotative disks, means for transmitting motion from one disk to another at predetermined intervals, a disk-actuating mechanism, stops operative in conjunction with coin-ejector mechanism to limit play of the disk-actuating mechanism, a resetter for this disk-actuating mechanism, and a latch for the resetter having release incidental to an operation of coin-ejector mechanism.

20. A coin-delivery and cash-register machine comprising inclined coin-chutes, a temporary coin-stop at the lower ends of the chutes, a coin-follower under tension in each of said chutes, a series of levers carrying pushers operative to eject coin from the chutes, a series of lever-actuating rockers, a series of reciprocative edgewise plates provided with rocker-actuating feet and having prolongations practically radial from a common center, a rotative toothed register-disk having said center for its axis, a series of plungers arranged in guides concentric with the disk to be actuated by the prolongations of said plates, a spring-controlled pawl-arm having the same axis as said disk and limited as to rotary movement with the latter by any one of said plungers brought in its path, an automatic detent for the disk, and spring-controlled release and reset mechanism for the pawl-arm coöperative with any one of the aforesaid plates.

21. A coin-delivery and cash-register machine comprising inclined coin-chutes, a temporary coin-stop at the lower ends of the chutes, a coin-follower under tension in each of the said chutes, a series of levers carrying pushers operative to eject coin from the chutes, a series of lever-actuating rockers, a series of reciprocative edgewise plates provided with rocker-actuating feet and having prolongations practically radial from a common center, a plurality of rotative toothed register-disks having said center for their axis, suitable means for transmitting motion from one disk to another at predetermined intervals, a series of plungers arranged in guides concentric with the disks to be actuated by the prolongations of said plates, a spring-controlled pawl-arm having the same axis as said disks and limited as to rotary movement with one of the latter by any one of the plungers brought in its path, automatic detents for said disks, and spring-controlled release and reset mechanism for the pawl-arm coöperative with any one of said plates.

22. A coin-delivery and cash-register machine comprising inclined coin-chutes, a temporary coin-stop at the lower ends of the chutes, a coin-follower under tension in each of said chutes, a series of levers carrying pushers operative to eject coin from the chutes, a series of lever-actuating rockers, a series of reciprocative edgewise plates provided with rocker-actuating feet and having prolongations practically radial from a common center, a rotative toothed register-disk having said center for its axis, a pawl-arm having a spring-controlled stem in rotative slip engagement in the bearing for the disk, a lifting-lever for the stem having yielding spring-resisted play thereon, a spring-controlled rocker in opposition to shouldered cam ends of said plates, a cam-latch depending from the latter rocker to engage and normally support the lever, in position to hold the pawl-arm out of engagement with said disk, a detent for this disk in the descending path of said lever, a series of plungers arranged in guides concentric with said disk to be actuated by the prolongations of said plates to come in the working path of the pawl-arm subsequent to an automatic engagement of the latter with the aforesaid disk, a spring-controlled reset mechanism for the aforesaid lever and pawl-arm and a latch for this mechanism coöperative with the spring-controlled rocker.

23. A coin-delivery and cash-register machine comprising a series of inclined coin-chutes, a temporary coin-stop at the lower ends of the chutes, a coin-follower under tension in each of said chutes, a series of levers carrying pushers operative to eject coin from the chutes, a series of lever-actuating rockers, a series of reciprocative edgewise plates provided with rocker-actuating feet and having prolongations practically radial from a common center, a rotative toothed register-disk having said center for its axis, a series of plungers arranged in guides concentric with the disks to be actuated by the prolongations of said plates, a spring-controlled pawl-arm having the same axis as said disk and limited as to rotary movement with the latter by any one of said plungers brought in its path, an automatic detent for the disk, a spring-controlled cash-drawer, an automatic latch for the same, a latch-trip mechanism coöperative with any one of the aforesaid plates, and a pawl-arm push-rod extended from the cash-drawer.

24. A coin-delivery and cash-registering machine comprising a rotative toothed register-disk, an automatic detent for the same, a spring-controlled slide carrying a similarly-controlled disk-engaging pawl, a latch for the slide, a latch-release mechanism, a series of reciprocative push-stems individually operative to trip the latch-release mechanism and limit play of said slide, a spring-controlled reset mechanism for the aforesaid slide, and a latch for this mechanism arranged to be tripped by an action of any one of the push-stems.

25. A coin-delivery and cash-registering machine comprising a plurality of rotative toothed register-disks, suitable means for transmitting movement from one disk to another at predetermined intervals, automatic detents for the disks, a spring-controlled slide carrying a similarly-controlled pawl engaging one of the disks, a latch for the slide, a latch-release mechanism, a series of reciprocative push-stems individually operative to trip the latch-release mechanism and limit play of said slide, a spring-controlled reset mechanism for the aforesaid slide, and a latch for this mechanism arranged to be tripped by an action of any one of the push-stems.

26. A coin-delivery and cash-registering machine comprising inclined coin-chutes, a temporary coin-stop at the lower ends of all the chutes, a coin-follower under tension in each of said chutes, levers carrying pushers operative to eject coin from the chutes, a series of lever-actuating rockers, a series of edgewise plates provided with rocker-actuating feet and having prolongations practically radial from a common center, rotative toothed register-disks having said center for their axis, suitable means for transmitting motion from one disk to another at predetermined intervals, a series of plungers arranged in guides concentric with the disks to be actuated by the prolongations of said plates, a spring-controlled pawl-arm having the same axis as said disks and limited as to rotary movement with one of the latter by any one of the plungers brought in its path, automatic detents for said disks, a spring-controlled slide carrying a similarly-controlled pawl engaging the disk that receives motion from the one with which said pawl-arm operates, a latch for the slide, a latch-release mechanism, a series of reciprocative stems individually operative to trip the latch-release mechanism and limit play of said slide, a spring-controlled reset mechanism for the pawl-arm and slide, and a latch for this reset mechanism having trip coincident with an operation of any of the aforesaid plates or stems.

27. A coin-delivery and cash-registering machine comprising inclined coin-chutes, a temporary coin-stop at the lower ends of all the chutes, a coin-follower under tension in each of said chutes, levers carrying pushers operative to eject coin from the chutes, a series of lever-actuating rockers, a series of edgewise plates provided with rocker-actuating feet and having prolongations practically radial from a common center, rotative toothed register-disks having said center for their axis, suitable means for transmitting motion from one disk to another at predetermined intervals, a series of plungers arranged in guides concentric with the disks to be actuated by prolongations of said plates, a spring-controlled pawl-arm having the same axis as said disks and limited as to rotary movement with one of the latter by any one of the plungers brought in its path, automatic detents for said disks, a spring-controlled slide carrying a similarly-controlled pawl engaging the disk that receives motion from the one with which said pawl-arm operates, a latch for the slide, a latch-release mechanism, a series of reciprocative stems individually operative to trip the latch-release mechanism and limit play of said slide, a spring-controlled cash-drawer, an automatic latch for the same, a trip mechanism for the latter latch coöperative with either of the aforesaid plates or stems, and rods extending from the cash-drawer as means for resetting the aforesaid pawl-arm and slide.

28. A coin-delivery apparatus and cash-register machine comprising a series of inclined coin-chutes, a temporary coin-stop at the lower ends of the chutes, a coin-follower under tension in each of said chutes, a delivery-chute in front of the coin-stop, mechanism for ejecting coin from the inclined coin-chutes into the delivery-chute, a spring-controlled cash-drawer having a clearance-space that permits of a hand of the machine operator being placed in position to receive coin from the delivery-chute outlet, an automatic latch for holding the drawer in closed position, and a latch-release and cash-register mechanism coöperative with coin-ejector mechanism.

29. A coin-delivery apparatus and cash-register mechanism comprising a series of inclined coin-chutes, a temporary coin-stop at the lower ends of the chutes, a coin-follower under tension in each of said chutes, a delivery-chute in front of the coin-stop, mechanism for ejecting coin from the inclined chutes into the delivery-chute, a spring-controlled cash-drawer having a clearance-space that permits of a hand of the machine operator being placed in position to receive coin from the delivery-chute outlet, an automatic latch for holding the drawer in closed position, a latch-release and cash-register mechanism coöperative with the coin-ejector mechanism, and other mechanism operative to trip the drawer-latch as well as to effect registration of cash independent of said coin-ejector mechanism.

In testimony that I claim the foregoing I have hereunto set my hand, at Watertown, in the county of Jefferson and State of Wisconsin, in the presence of two witnesses.

EDWARD J. BRANDT.

Witnesses:
ROBT. DENT,
WILLIAM H. WOODARD.